United States Patent Office 2,721,226
Patented Oct. 18, 1955

2,721,226

CONVERSION OF AROMATIC HYDROCARBONS INTO ALKYL CYCLOPARAFFINS

Frank G. Ciapetta, Llanerch, and James B. Hunter, Havertown, Pa., assignors to The Atlantic Refining Company, Philadelphia, Pa., a corporation of Pennsylvania No Drawing. Application August 17, 1949, Serial No. 110,875

7 Claims. (Cl. 260—667)

The present invention relates to a method for converting aromatic hydrocarbons into alkyl cycloparaffins having the same number of carbon atoms as the initial aromatic hydrocarbons. More particularly, this invention is concerned with the direct conversion of mononuclear and polynuclear aromatic hydrocarbons into alkyl cycloparaffins in the presence of hydrogen and an agent consisting essentially of silica-alumina carrying a hydrogenation catalyst.

In accordance with this invention, an aromatic hydrocarbon is contacted with a conversion agent of silica-alumina carrying a hydrogenation catalyst in the presence of hydrogen at pressures between 100 and 1000 lbs./sq. in., and preferably 300 to 700 lbs./sq. in., at a temperature between 450° F. and 800° F., and preferably 500° F. to 750° F., the space velocity being between 0.02 and 2 volumes of hydrocarbon per volume of catalyst per hour. The hydrogen to hydrocarbon mole ratio may range between 4 and 20 to 1, and preferably between 5 and 10 to 1. The conversion agent consists essentially of 98%–40% of silica and 2% to 60% of alumina having distended thereon or being impregnated with 0.2% to 20% of a hydrogenation catalyst (based upon the metal component thereof), and preferably 1% to 10% thereof.

The silica may be separately prepared by acidifying an alkali metal silicate solution to precipitate hydrated silica, and separately prepared hydrated alumina may be mixed therewith, or the silica-alumina may be precipitated together, or silica gel may be impregnated with a decomposable aluminum salt and then heated to effect deposition of alumina on the silica. Alternatively, the alumina may be precipitated on the aluminum salt-impregnated silica by the addition of a base such as ammonia, alkali metal hydroxide, carbonate or bicarbonate. A variety of methods for preparing this carrier are known and published, and since this invention is not concerned with any specific method of preparation, it will not be considered in detail at this point. Suffice to say that the silica comprises 98%–40% and the alumina 2%–60% of the carrier. Materials whose alumina content is substantially greater than 60%, for example, 80% to 98%, when used in conjunction with hydrogenation catalysts, are not effective in the conversion of the aromatic hydrocarbons. The hydrogenation catalysts employed in conjunction with silica-alumina in accordance with the present invention, include particularly the metals, oxides, and salts of the elements of group VI and VIII of the periodic system. Specifically, but not by way of limitation, these catalysts include the oxides of chromium, molybdenum, tungsten, and uranium, the metals nickel, cobalt, iron, platinum, palladium, and the salts thereof, such as the molybdates, thiomolybdates, phosphates, tungstates, chromates, and borates.

The aromatic hydrocarbons which may be converted in accordance with this invention include benzene, toluene, xylene, cymene, cumene, naphthalene, mono-methyl naphthalene, dimethylnaphthalene, the ethyl naphthalenes, the propyl naphthalenes, and the like. From benzene there is obtained methyl cyclopentane and by-product cyclohexane, while from toluene the isomeric dimethyl cyclopentanes, ethyl cyclopentane, and by-product methyl cyclohexane are produced. Xylene gives the isomeric methyl ethyl cyclopentanes, trimethyl cyclopentanes, and by-product dimethyl cyclohexane. From naphthalene is produced 1-methyl hydrindane, 1,6 dimethyl pentalane, and by-product decalin.

In carrying out the conversion, the aromatic hydrocarbon and hydrogen may be passed through a conversion chamber containing the granular or pelleted catalyst, the temperature, pressure, and space velocity being controlled within the limits hereinbefore prescribed. The conversion products, i. e., the alkyl cycloparaffins, may be separated from the by-product cycloparaffins, if desired, and from unconverted aromatic hydrocarbon by suitable means such as fractional distillation or fractional condensation.

This invention may be further illustrated by the following examples, which, however, are not to be construed as limiting the scope thereof.

The conversion vessel comprising a pressure tube connected with benzene and a hydrogen supply was filled with 50 cc. of catalyst. The vessel was heated to the desired temperature by external electric resistance heaters, and aromatic hydrocarbon was charged at the desired rate, the vessel being maintained under a constant hydrogen pressure of 350 lbs./sq. in. The mole ratio of hydrogen to hydrocarbon was held between 4 and 6 to 1. The system was operated for 1 hour to attain equilibrium and all products produced during this pre-run were discarded. Following the equilibration pre-run, the test was continued for ½ hour, during which all products, both liquid and gaseous were collected and analyzed. In all cases, the catalyst, prior to use, was activated by heating for 16 hours at 1000° F. while passing through 90 to 125 liters of hydrogen at atmospheric pressure. It has been found that in substantially all cases the percent conversion decreases if the catalyst is activated below 900° F. or above 1000° F.

The conversion agent employed in accordance with the examples was prepared as follows:

The silica-alumina component was prepared by adding to an aqueous solution of sodium silicate, sufficient sulfuric acid to precipitate hydrous silicic acid. This was thoroughly washed with water, and sufficient aqueous solution of aluminum sulfate was added to the silicic acid gel to give 13% alumina in the ultimate product. The alumina was then precipitated in the gel by the addition of ammonium hydroxide solution, and the silica-alumina gel was separated, washed, and dried. The gel was thereafter calcined at 900° F.–1000° F. to a residual water content of 4%–5% by weight. The resulting silica-alumina was impregnated with 5% by weight of nickel as follows. 198 grams of $Ni(NO_3)_2.6H_2O$ was dissolved in water to make 1 liter of solution. 760 grams of $SiO_2$—$Al_2O_3$ prepared as above described, was slurried with 700 cc. of water, and the slurry was added to the $Ni(NO_3)_2$ solution. To this mixture was slowly added, with stirring, 1 liter of ammonium carbonate solution containing 105 grams of $(NH_4)_2CO_3$, thereby causing precipitation of $NiCO_3$ in the silica-alumina. The entire mixture was stirred for 15 minutes, filtered, and dried at 220° F. without washing. The dried catalyst was ball-milled for 1 hour and then pelleted into 3/16-inch pellets in a conventional pelleting machine. The pellets were calcined at 800° F. in an atmosphere of hydrogen to decompose the $NiCO_3$ to $NiO$, and the silica-alumina containing $NiO$ was reduced at 1000° F. in hydrogen for 16 hours to give silica-alumina containing 5% of metallic nickel.

The results obtained in the conversion of benzene and of toluene are given in the following tables.

[Liquid space velocity 0.064]

| Run No. (Benzene) | 1 | 2 | 3 | 4 | 5 |
|---|---|---|---|---|---|
| Temp., °F | 610 | 667 | 720 | 735 | 765 |
| Recovery (Wt. Percent) | 95.6 | 100.0 | 96.8 | 99.4 | 96.7 |
| Methylcyclopentane (Wt. Percent) | 66.5 | 81.7 | 75.3 | 79.8 | 59.4 |
| Cyclohexane (Wt. Percent) | 21.1 | 19.3 | 11.7 | 7.2 | 8.1 |

[Liquid space velocity 0.18]

| Run No. (Benzene) | 6 | 7 | 8 | 9 | 10 |
|---|---|---|---|---|---|
| Temp., °F | 578 | 630 | 680 | 760 | 797 |
| Recovery (Wt. Percent) | 99.0 | 100.0 | 100.0 | 98.6 | 98.5 |
| Methylcyclopentane (Wt. Percent) | 38.9 | 72.1 | 82.8 | 63.3 | 45.3 |
| Cyclohexane (Wt. Percent) | 60.1 | 26.5 | 15.6 | 7.6 | 5.4 |

[Liquid space velocity 0.40]

| Run No. (Benzene) | 11 | 12 | 13 | 14 | 15 |
|---|---|---|---|---|---|
| Temp., °F | 639 | 671 | 720 | 770 | 805 |
| Recovery (Wt. Percent) | 98.4 | 100.0 | 100.0 | 96.3 | 100.0 |
| Methylcyclopentane (Wt. Percent) | 76.4 | 79.4 | 71.1 | 57.7 | 27.0 |
| Cyclohexane (Wt. Percent) | 21.8 | 14.8 | 12.3 | 9.1 | 3.8 |

[Liquid space velocity 0.46]

| Run No. (Toluene) | 16 | 17 | 18 | 19 | 20 |
|---|---|---|---|---|---|
| Temp., °F | 528 | 572 | 627 | 675 | 700 |
| Recovery (Wt. Percent) | 100.0 | 100.0 | 100.0 | 95.2 | 100.0 |
| Yield (Wt. Percent): | | | | | |
| 1-1 dimethylcyclopentane | 2.06 | 3.91 | 6.99 | 4.33 | 1.52 |
| 1-2 dimethylcyclopentane | 10.27 | 13.25 | 17.32 | 12.29 | 3.26 |
| 1-3 dimethylcyclopentane | 0.93 | 7.46 | 19.89 | 24.05 | 6.48 |
| Methyl cyclohexane | 77.39 | 63.63 | 42.72 | 19.37 | 3.05 |
| Ethyl cyclopentane | 9.16 | 11.56 | 11.43 | 8.13 | 2.11 |
| Toluene | 0.19 | 0.19 | 1.66 | 31.83 | 83.57 |

From the above data, it is apparent that substantial conversion of benzene into methylcyclopentane was obtained, particularly at temperatures of 600° F. to 750° F. With increasing temperature, the yield of by-product cyclohexane is decreased. From toluene, substantial yields of the methyl and ethyl cyclopentanes were produced at 500° F. to 700° F. Similar conversions may also be obtained with silica-alumina carrying hydrogenation catalysts other than nickel, for example, Co, Pt, Cu, $NiWO_4$, $NiMoO_4$, $Ni_3(PO_4)_2$, $NiCrO_4$, $NiB_4O_7$, $NiMoS_4$, $MoO_3$, $V_2O_5$, $CuCrO_4$, $WO_2$ and $CrO_3$. The conversion may be effected either in a fixed bed system or moving bed system using granular or pelleted catalysts, or if desired, the catalyst may be employed as a finely divided power suspended in the aromatic hydrocarbon during reaction and separable from the hydrocarbons upon completion of the reaction.

We claim:

1. A method of converting an aromatic hydrocarbon into an alkyl cycloparaffin, which comprises contacting said aromatic hydrocarbon, at a temperature between 450° F. and 800° F. in the presence of hydrogen at a pressure between 100 and 1000 lbs./sq. in., with an agent consisting essentially of 98%–40% silicon and 2%–60% alumina impregnated with a metal-containing hydrogenation catalyst from the group consisting of Ni, Co, Pt, $NiWO_4$, $NiMoO_4$, $Ni_3(PO_4)_2$, $NiCrO_4$, $NiB_4O_7$, $NiMoS_4$, $MoO_3$, $V_2O_5$, $CuCrO_4$, $WO_2$ and $CrO_3$, the metal component of which constitutes from 0.2% to 20% by weight of the silica-alumina.

2. A method of converting an aromatic hydrocarbon into an alkyl cycloparaffin, which comprises contacting said aromatic hydrocarbon, at a temperature between 450° F. and 800° F. in the presence of hydrogen at a pressure between 100 and 1000 lbs./sq. in., and at a space velocity between 0.02 and 2, with an agent consisting essentially of 98%–40% silica and 2%–60% alumina impregnated with a metal-containing hydrogenation catalyst from the group consisting of Ni, Co, Pt, $NiWO_4$, $NiMoO_4$, $Ni_3(PO_4)_2$, $NiCrO_4$, $NiB_4O_7$, $NiMoS_4$, $MoO_3$, $V_2O_5$, $CuCrO_4$, $WO_2$, and $CrO_3$, the metal component of which constitutes from 0.2% to 20% by weight of the silica-alumina.

3. A method of converting an aromatic hydrocarbon into an alkyl cycloparaffin, which comprises contacting said aromatic hydrocarbon, at a temperature between 450° F. and 800° F. in the presence of hydrogen at a pressure between 100 and 1000 lbs./sq. in., and at a space velocity between 0.02 and 2, with an agent consisting essentially of 98%–40% silica and 2%–60% alumina impregnated with a nickel-containing hydrogenation catalyst, the nickel component of which constitutes from 0.2% to 20% by weight of the silica-alumina.

4. A method of converting benzene into methylcyclopentane, which comprises contacting benzene, at a temperature between 450° F. and 800° F. in the presence of hydrogen at a pressure between 100 and 1000 lbs./sq. in., with an agent consisting essentially of 98%–40% silica and 2%–60% alumina impregnated with a metal-containing hydrogenation catalyst from the group consisting of Ni, Co, Pt, $NiWO_4$, $NiMoO_4$, $Ni_3(PO_4)_2$, $NiCrO_4$, $NiB_4O_7$, $NiMoS_4$, $MoO_3$, $V_2O_5$, $CuCrO_4$, $WO_2$, and $CrO_3$, the metal component of which constitutes from 0.2% to 20% by weight of the silica-alumina.

5. A method of converting benzene into methylcyclopentane, which comprises contacting benzene, at a temperature between 450° F. and 800° F. in the presence of hydrogen at a pressure between 100 and 1000 lbs./sq. in., and at a space velocity between 0.02 and 2, with an agent consisting essentially of 98%–40% silica and 2%–60% alumina impregnated with a nickel-containing hydrogenation catalyst, the nickel component of which constitutes from 0.2% to 20% by weight of the silica-alumina.

6. A method of converting toluene into alkyl cyclopentanes, which comprises contacting toluene, at a temperature between 450° F. and 800° F. in the presence of hydrogen at a pressure between 100 and 1000 lbs./sq. in., with an agent consisting essentially of 98%–40% silica and 2%–60% alumina impregnated with a metal-containing hydrogenation catalyst from the group consisting of Ni, Co, Pt, $NiWO_4$, $NiMoO_4$, $Ni_3(PO_4)_2$, $NiCrO_4$, $NiB_4O_7$, $NiMoS_4$, $MoO_3$, $V_2O_5$, $CuCrO_4$, $WO_2$, and $CrO_3$, the metal component of which constitutes from 0.2% to 20% by weight of the silica-alumina.

7. A method of converting toluene into alkyl cyclopentanes, which comprises contacting toluene, at a temperature between 500° F. and 700° F. in the presence of hydrogen at a pressure between 100 and 1000 lbs./sq. in. with an agent consisting essentially of 98%–40% silica and 2%–60% alumina impregnated with a nickel-containing hydrogenation catalyst, the metal component of which constitutes from 0.2% to 20% by weight of the silica-alumina.

References Cited in the file of this patent

UNITED STATES PATENTS

| 2,142,324 | McKinney | Jan. 3, 1939 |
| 2,285,314 | Thomas | June 2, 1942 |
| 2,495,700 | Corson | Jan. 31, 1950 |
| 2,585,337 | McKinley | Feb. 12, 1952 |

OTHER REFERENCES

Ogawa et al.: "Bull. Chem. Soc. Japan," vol. 5 (1930), page 266. Abstracted in Centralblatt 1931, I, page 50.

Schoreel: "Jour. Inst. Pet. Tech.," vol. 18 (1932), page 179. Abstracted in Centralblatt 1932, II, page 517.

Pushkov et al.: "Jour. Gen. Chem.," U. S. S. R., vol. 8, pages 1756–62 (1938).

Maslyanskii: Jour. Gen. Chem. (U. S. S. R.), vol. 14 (1944), pages 148–60. Abstracted in Chem. Abs., vol. 39 (1945), page 2285.